United States Patent
Emma et al.

(10) Patent No.: US 10,776,155 B2
(45) Date of Patent: Sep. 15, 2020

(54) AGGREGATING, DISAGGREGATING AND CONVERTING ELECTRONIC TRANSACTION REQUEST MESSAGES

(71) Applicant: INTERNATIONAL BUSINESS MACHINES CORPORATION, Armonk, NY (US)

(72) Inventors: Philip G. Emma, Danbury, CT (US); Michael B. Healy, Cortlandt Manor, NY (US); Tejas Karkhanis, White Plains, NY (US); Ching-Pei Lin, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 169 days.

(21) Appl. No.: 15/922,192

(22) Filed: Mar. 15, 2018

(65) Prior Publication Data
US 2019/0286473 A1    Sep. 19, 2019

(51) Int. Cl.
*G06F 9/46* (2006.01)
*G06F 9/54* (2006.01)
*G06F 13/16* (2006.01)

(52) U.S. Cl.
CPC .............. *G06F 9/466* (2013.01); *G06F 9/546* (2013.01); *G06F 13/1642* (2013.01)

(58) Field of Classification Search
CPC ....................................................... G06F 9/466
See application file for complete search history.

(56) References Cited

U.S. PATENT DOCUMENTS

| 5,046,000 A * | 9/1991 | Hsu .......................... G06F 5/06 711/100 |
| 7,401,117 B2 | 7/2008 | Dan et al. |
| 8,516,163 B2 * | 8/2013 | Wang ..................... G06F 13/28 710/22 |
| 2011/0145312 A1 | 6/2011 | Gokulakannan et al. |

(Continued)

OTHER PUBLICATIONS

Gehringer, CSC/ECE 506 Lecture Notes, Spring 2002, NC State University (Year: 2002).*

(Continued)

*Primary Examiner* — Charlie Sun
(74) *Attorney, Agent, or Firm* — Cantor Colburn LLP; Kevin Michael Jordan

(57) ABSTRACT

Embodiments include method, systems and computer program products for fusing one or more transaction request messages. The computer-implemented method includes comparing, using a memory controller, at least two electronic transaction request messages and determining if the at least two electronic transaction request messages are of a same electronic transaction request message type. The memory controller is used to determine that the at least two electronic transaction request messages are directed to associated portions of memory based at least in part on determining that the at least two electronic transaction request messages are the same electronic transaction request message type. The memory controller fuses the at least two electronic transaction request messages based at least in part on determining that the at least two electronic transaction request messages are directed to associated portions of memory.

18 Claims, 6 Drawing Sheets

(56) References Cited

U.S. PATENT DOCUMENTS

2015/0365311 A1   12/2015  Klein
2016/0378502 A1*  12/2016  Burger ................. G06F 9/3802
                                                                     712/214
2017/0249187 A1*   8/2017  van der Lugt ........ G06F 9/4881

OTHER PUBLICATIONS

Anonymously,"Concurrent Memory Read Controller for the PCI Express Bridge", Ip.com, Feb. 28, 2005, p. 1-4.
Authors et al.,"Fast supplemental method to defragment physical memory in an operating system", Ip.com, Nov. 20, 2009, p. 1-4.
Tianyue Lu, et al."Achieving Efficient Packet-based Memory System by Exploiting Correlation of Memory Requests", National Natural Science Foundation of China, 2014, p. 1-6.

* cited by examiner

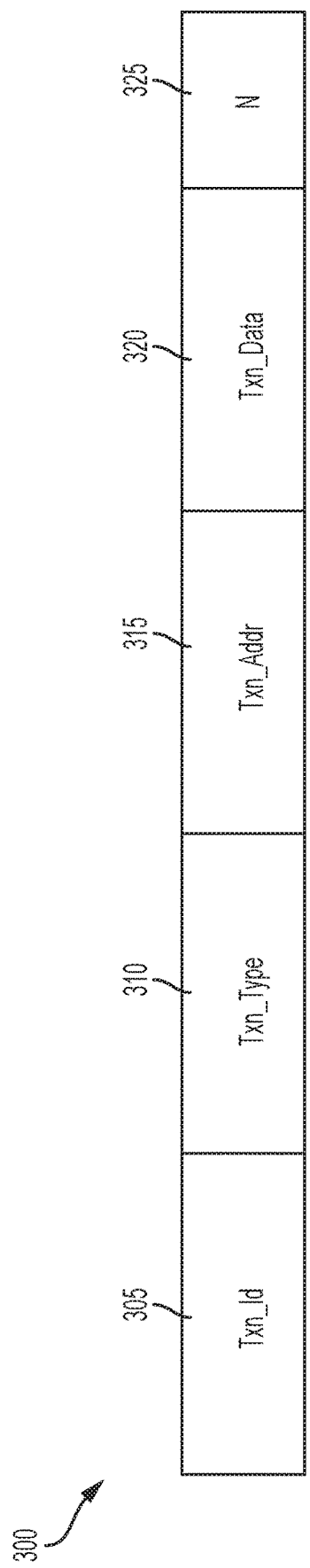
FIG. 3
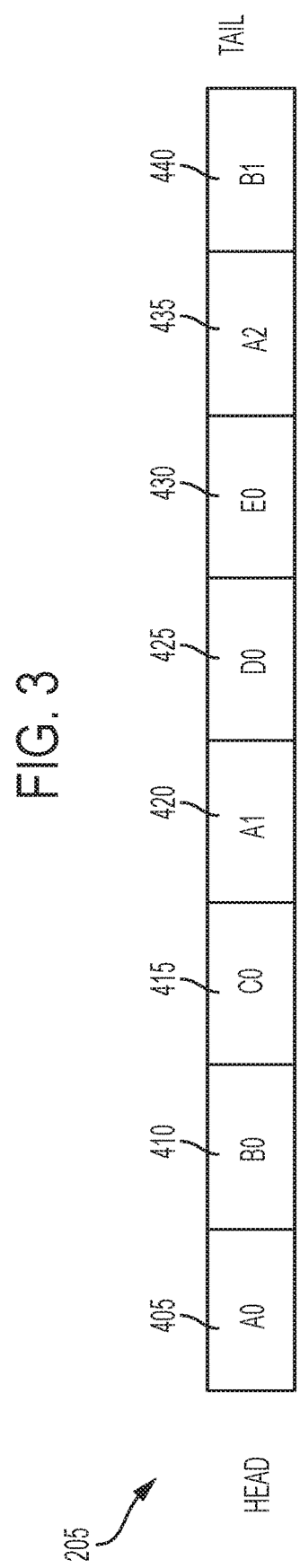
FIG. 4
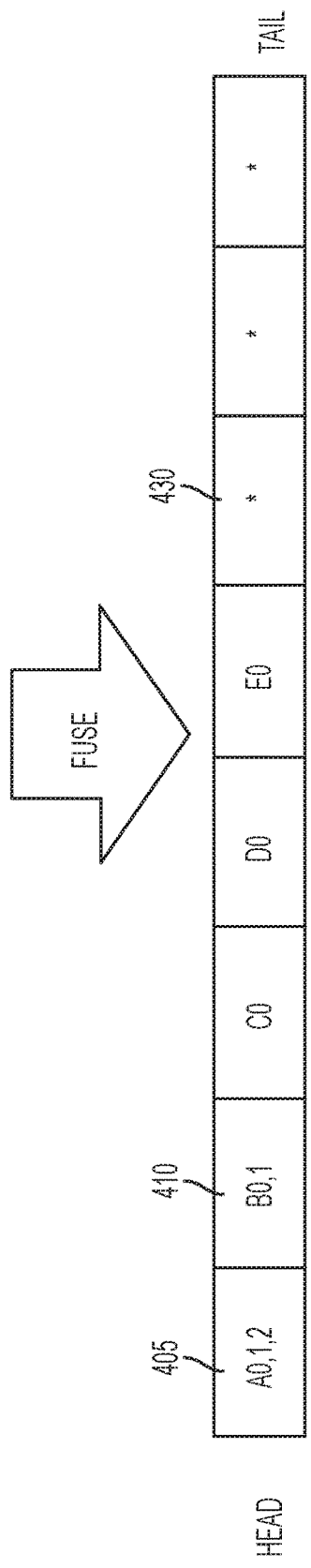

AGGREGATING, DISAGGREGATING AND CONVERTING ELECTRONIC TRANSACTION REQUEST MESSAGES

BACKGROUND

The present invention relates in general to organizing transaction requests in a computing device or system, and more specifically, to aggregating/fusing transaction requests of the same type that request access to contiguous lines of memory.

In computer architecture, a memory hierarchy is used to visualize and address performance issues in computer architectural design, algorithm predictions, and lower level programming. The memory hierarchy separates each hierarchy level based on response time.

Computer systems, processors, caches, I/O device and other devices in the computer architecture access data in memory using one or more memory controllers. The memory controllers manage the movement of data to and from memory, for example, a dynamic random access memory (DRAM). In some computer systems, an electronic transaction message is a request to access a memory location in memory.

SUMMARY

Embodiments of the invention are directed to a computer-implemented method for aggregating/fusing electronic transaction request messages. A non-limiting example of the computer-implemented method includes comparing, using a memory controller, at least two electronic transaction request messages and determining if the at least two electronic transaction request messages are of a same electronic transaction request message type. The memory controller is used to determine that the at least two electronic transaction request messages are directed to associated portions of memory based at least in part on determining that the at least two electronic transaction request messages are the same electronic transaction request message type. The memory controller fuses the at least two electronic transaction request messages based at least in part on determining that the at least two electronic transaction request messages are directed to associated portions of memory.

One or more embodiments of the present invention provide a computer program product can comprise a non-transitory storage medium readable by a processing circuit that can store instructions for execution by the processing circuit for performing a method for aggregating/fusing transaction requests. The method includes comparing, using a memory controller, at least two electronic transaction request messages and determining if the at least two electronic transaction request messages are of a same electronic transaction request message type. The memory controller is used to determine that the at least two electronic transaction request messages are directed to associated portions of memory based at least in part on determining that the at least two electronic transaction request messages are the same electronic transaction request message type. The memory controller fuses the at least two electronic transaction request messages based at least in part on determining that the at least two electronic transaction request messages are directed to associated portions of memory.

One or more embodiments of the present invention provide a system for aggregating/fusing transaction requests. The system can include a processor and memory controller in communication with one or more types of memory. The memory controller can be configured to compare at least two transaction requests messages and determine if the at least two electronic transaction request messages are of a same electronic transaction request message type. The memory controller is used to determine that the at least two electronic transaction request messages are directed to associated portions of memory based at least in part on determining that the at least two electronic transaction request messages are the same electronic transaction request message type. The memory controller fuses the at least two electronic transaction request messages based at least in part on determining that the at least two electronic transaction request messages are directed to associated portions of memory.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

FIG. 3 is an illustration of an exemplary queue entry for the memory controller described in FIG. 2 according to one or more embodiments of the present invention;

FIG. 4 is an illustration of an exemplary transaction request fusion performed on a queue according to one or more embodiments of the present invention;

Figure 1:
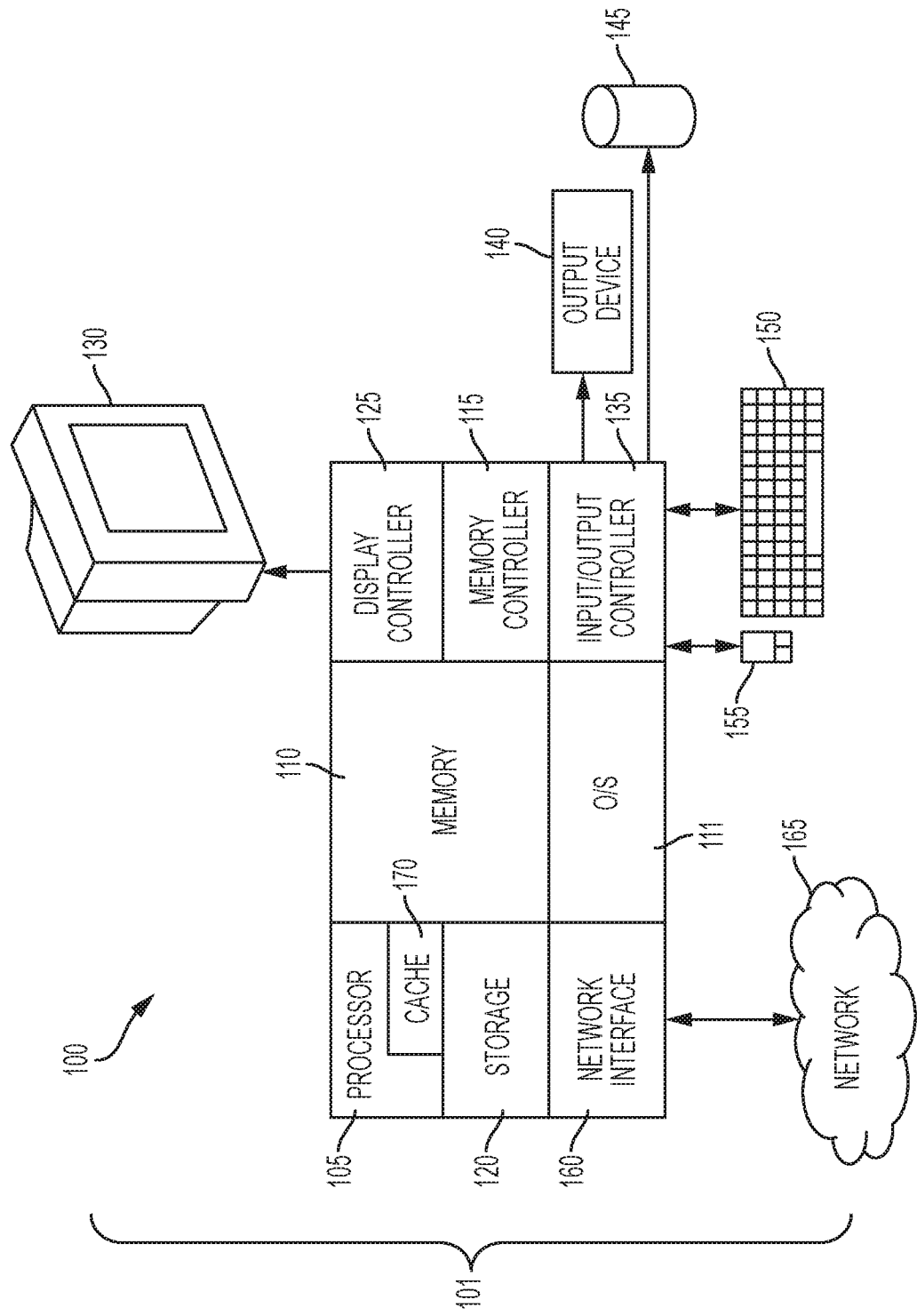
FIG. 1 is a block diagram illustrating one example of a processing system for practice of the teachings herein.

The diagrams depicted herein are illustrative. There can be many variations to the diagram or the operations described therein without departing from the spirit of the invention. For instance, the actions can be performed in a differing order or actions can be added, deleted or modified. In addition, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments of the present invention, the various elements illustrated in the figures are provided with two or three digit reference numbers. With

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, embodiments of the invention are related in general to a memory controller and instructions used by the memory controller. A memory controller manages a variety of memory-related operations, including, for example, memory read operations, memory write operations, and keeping the random access memory (RAM) portions of the memory active by supplying the memory with electric current. In a known configuration, the memory controller can include a front end and a back end. The front end buffers requests, buffers responses, acts as an interface with system components, etc. The back end provides an interface with various system components including, for example, main memory components.

Memory controllers manage data access to and from memory by processing transaction request messages. An electronic transaction message is a request to access a memory location in memory. Transaction request messages received by the memory controller from a variety of devices in a computer architecture are stored in a queue for subsequent processing. Unfortunately, the size of the queue is limited, which limits the throughput of transaction requests.

Turning now to an overview of the aspects of the invention, one or more embodiments of the present invention provide a memory controller that is configured to compare transaction request messages within a queue to determine if any transaction request messages are of a same type, for example, READ or WRITE. If the transaction request messages are of the same type, the system determines if the transaction request messages are directed to contiguous portions of memory. If the transaction request messages are the same type of transaction and directed to contiguous portions of memory, the system can aggregate/fuse the multiple transaction request messages into a single transaction request message thereby freeing up locations in the queue that can be used to store new transaction request messages.

The above-described aspects of the invention address the shortcomings of the prior art by utilizing a memory controller having a request queue, for example, a transaction request queue, in which the memory controller can aggregate/fuse multiple transaction request messages (read or write) when the transaction request messages are of the same transaction type and directed to one or more contiguous memory locations even though the requested transaction request messages may not have originated from the same source or at the same time. The length of the fused request can vary depending on how many transaction request messages can be combined. Allowing the memory controller to fuse transaction request messages in the request queue allows for more transaction request messages to reside in the queue because transaction request messages that are fused which previously resided in multiple locations in the queue are combined into a single location freeing up locations in the queue. Fusing transactions also permits more efficient packaging of commands to memory.

Embodiments of the present invention provide methods, systems, structures and computer program products configured to utilize a memory controller that can convert fused transaction request messages residing in a transaction request queue into a command request to execute an operation on a memory. The conversion can also account for transaction request messages that can have a variable length due to being fused. Allowing the memory controller to convert a variable length transaction request message into a command request allows for a fulfillment of two or more fused operations to memory using a single command.

Embodiments of the present invention provide methods, systems, structures and computer program products configured to utilize a memory system having a request queue in which the memory system can disaggregate requests when the transaction request messages are determined to be of a size too large for processing by a memory controller. Allowing the memory system to disaggregate transaction request messages allows the memory controller to be used in multiple memory systems or service transaction request message from caches having different line sizes.

FIG. 1 is a block diagram illustrating one example of a processing system 100 for practice of the teachings described herein. In exemplary embodiments of the present invention, in terms of hardware architecture, the processing system 100 includes a computer 101 having a processor 105. The computer 101 further includes memory 110 coupled to a memory controller 115, and one or more input and/or output (I/O) devices 140, 145 (or peripherals) that are communicatively coupled via a local input/output controller 135. The input/output controller 135 can be, for example, but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in storage 120, cache storage 170, or memory 110. The processor 105 can also execute software stored in registers that are located inside the processor 105 (not shown). Each register typically holds a word of data (often 32 or 64 bits). The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 can include one or more cores.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). The memory 110 can be arranged in a set of memory banks comprised of elements arranged in rows and columns. Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. The instructions in the memory 110 can be a part of a suitable operating system (OS) 111. The operating system 111 essentially controls the execution of other computer programs and provides scheduling, input-output control, file and data management, memory management, and communication control and related services.

The cache 170 is a hardware device that stores data and is used by the processor 105 to reduce an average cost (time or energy) to access data from memory 110. The cache 170 is a smaller, faster memory that is located closer to one or more processor cores of the processor 105, which stores copies of the data from frequently used main memory locations. The amount of data accessed from memory 110 per request is based on a line size for cache 170.

The memory controller (MC) 115 is a hardware device for managing data traffic to and from memory 110. For example, the MC 115 can manage read and write operations to, for example, one or more DRAM components associated with the memory 110. Computer 101 can include a plurality of MCs 115 with each MC servicing transaction request messages from the one or more processor cores of the processor 105. When accessing one or more memory locations in memory 110 in response to one or more transaction request messages, the MC 115 can receive transaction request messages, which, for example, can be read or write requests of differing sizes. Each received transaction request message can be executed by generating and scheduling commands to one or more banks of the memory 110.

In an exemplary embodiment of the present invention, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment of the present invention, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment of the present invention, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or another similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals. Other networks include body area networks (BAN) where the electric field of a human body can be used to transmit signals.

If the computer 101 is a PC, workstation, intelligent device or the like, the instructions in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

Figure 2:
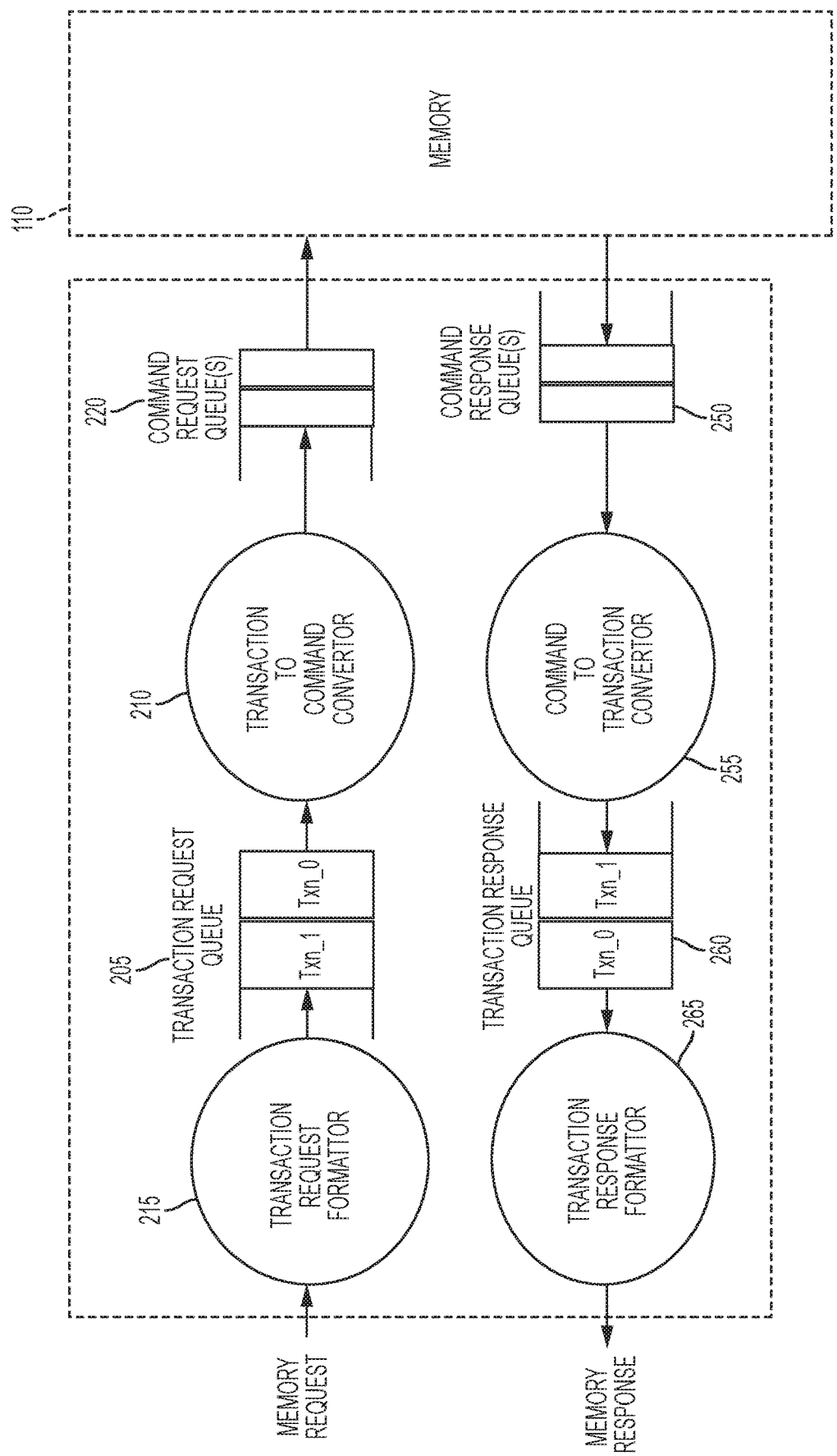
FIG. 2 is a block diagram illustrating one example of a memory controller of the processing system described in FIG. 1 for practice of the teachings herein.

In an exemplary embodiment of the present invention, as shown in FIG. 2, the memory controller 115 for computer 101 includes a transaction request formattor 215. The transaction request formator 215 processes transaction request messages, i.e., one or more memory requests and formats each of the one or more memory requests into an address format, for example, Row, Col. The transaction request formattor 215 can send the formatted one or more memory requests to transaction request queue 205. The transaction request queue 205 can store a plurality of transaction request messages received from the transaction request formattor 215. The size of the transaction request queue 205 can vary depending the model of the MC 115. In order to access locations in memory, the formatted one or more transaction request messages are converted to a format acceptable to memory 110. A transaction to command convertor 210 can generate memory commands to access one or more memory banks of memory 110 needed to fulfill the formatted one or more memory requests. Upon accessing memory 110 to fulfill the one or more memory requests, the requested data can be sent from the memory 110 to a command response queue 250. The command response queue 250 can send the requested data to a command to transaction converter 255 to convert the data returned from memory into a format usable by the processor 105. The converted data can be sent from the command to transaction converter 255 to a transaction request queue 260. The transaction request queue 260 can send the requested data to a transaction response formattor 265. The transaction response formattor 265 can send the requested data to cache 170 or processor 105. The transaction request queue 205 and the transaction response queue 260 can be combined into a single queue. The command request queue 220 and the command response queue 250 can also be combined into a single queue.

In an exemplary embodiment of the present invention, as shown in FIG. 3, a queue entry 300 for the transaction request queue 205 and/or the transaction response queue 260 can assume a format as illustrated. Section 305 of the entry 300 can be a transaction id containing a unique identifier for a transaction request message to be conducted by the MC 115. Section 310 can indicate a transaction type, for example, READ, WRITE, PREFETCH, IFETCH, etc. Section 315 can indicate an address of the transaction request. Section 320 stores data associated with the transaction request. For example, the data can be data read from memory 110 based on a READ transaction request or data to be written to memory 110 in response to a WRITE transaction request message. Section 325 stores a value (N) indicating a number of sequential accesses possible for fusion starting from the transaction address stored in section 315.

In an exemplary embodiment of the present invention, as shown in FIG. 4, the MC 115 can cause the transaction request queue 205 to combine/fuse one or more transactions as illustrated. As indicated, the transaction request queue 205 can store a plurality of transaction request messages, for example, transaction request messages, 405, 410, 415, 420, 425, 430, 435 and 440. As previously mentioned, each transaction request message can have a transaction type (310) and address (315) indicating a location of the desired data in memory 110. The MC 115 can analyze the transaction request queue 205 to determine that transaction request messages are of the same type and request access to data from contiguous lines in memory 110. For example, the MC 115 can determine that transaction request messages 405, 420 and 435 are of the same transaction type and directed to contiguous lines in memory 110. Accordingly, the MC 115 can fuse the transaction request messages in sections 405, 420 and 435 of the transaction request queue 205 into a single transaction request message (A0,1,2) that can be stored in a single section of transaction request queue 205, for example, section 405. This analysis can occur for other transaction request messages in the transaction request queue 205, for example, transaction request messages 410 and 440. The MC 115 can fuse transaction request messages 410 and 440 into a single transaction request message (B0,1) and store the single transaction request message in section 410 of the transaction request queue 205. By fusing transaction request messages in the transaction request queue 205, the MC 115 can free up locations, for example, section 430, in the transaction request queue 205 that can be used to store new transaction request messages.

Figure 5:
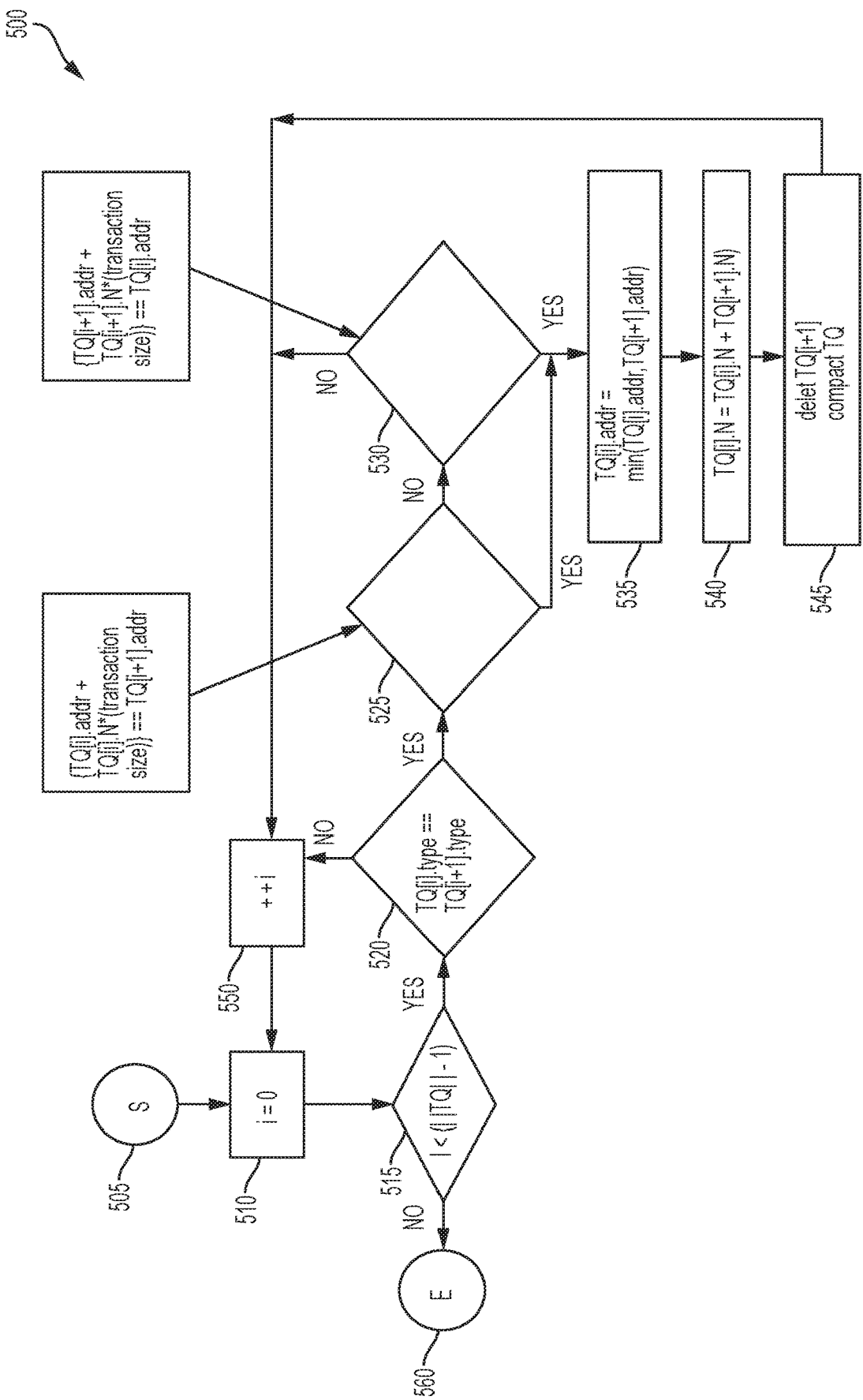
FIG. 5 is a flow diagram illustrating a method of fusing transaction requests according to one or more embodiments of the present invention.

FIG. 5 is a flow diagram illustrating a method 500 of fusing transaction request messages according to one or more embodiments of the present invention. The method 500 is performed by the MC 115 shown in FIG. 1. After starting at block 505, the method proceeds to block 510 and initializes a counter value (i) to zero. At block 515, the MC 115 can determine whether counter value (i) is less than an absolute value associated with a transaction request message minus 1. If the counter value (i) is not less than the absolute value associated with a transaction request message minus 1, the method ends (560). If the counter value (i) is less than the absolute value associated with a transaction request message minus 1, the method proceeds to block 520 in which a comparison of transaction types occurs between transaction request messages located in adjoining locations of the transaction request queue 205 to determine whether or not the transaction request messages are of the same type, for example, READ or WRITE. If the transaction request messages are not of the same type, the method proceeds to block 550 in which counter value (i) can be increased. If the transaction request messages are of the same type, the method proceeds to block 525 in which address locations for the transaction request messages having the same transaction type are compared to determine if the address locations are contiguous in memory 110. If, at block 525, the method 500 determines that the address locations are contiguous, the method 500 proceeds to block 535. If, at block 525, the method 500 determines that the address locations are not contiguous, the method 500 proceeds to block 530, in which a verification of contiguity occurs by reversing the comparison of block 525. If the verification of contiguity at block 530 verifies that the address locations are non-contiguous, the method 500 proceeds to block 550. If the verification of contiguity at block 530 verifies that the address locations are contiguous, the method 500 proceeds to block 535. At block 535, the method 500 fuses the transaction request messages determined to be of the same transaction type (i.e., a second transaction request message fused to a first transaction request message) and directed to contiguous memory locations within memory 110 into a single location in the transaction request queue 205. At block 540, the method 500 can update section 325 of the queue entry 300 to indicate that an additional sequential memory access from the transaction address located at section 315 of the queue entry 330 may be needed. At block 545, the method 500 can delete the second transaction request message from a section of transaction request queue 205 because the second transaction request message has been fused with the first transaction request message at block 535. The section previously storing the second transaction request message can then store a new transaction request message. Accordingly, the method 500 can group multiple transaction request messages into a single transaction request message based on the transaction request messages spatial contiguity in memory, regardless of a temporal sequence of transaction request messages in the transaction request queue 205.

Figure 6:
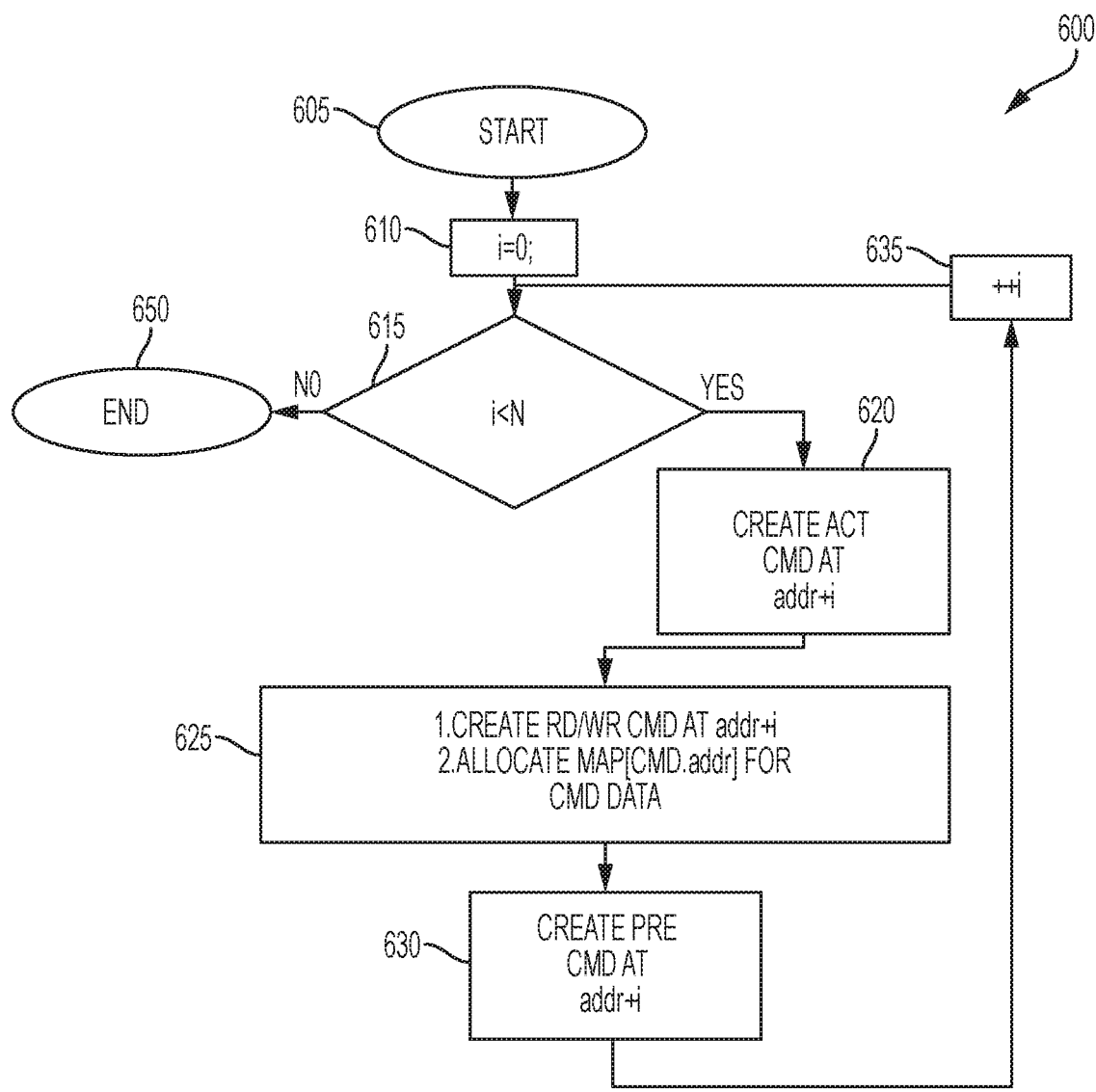
FIG. 6 is a flow diagram illustrating a method of converting transaction or command requests of variable lengths according to one or more embodiments of the present invention.

FIG. 6 is a flow diagram illustrating a method 600 of converting transaction or command requests of variable lengths according to one or more embodiments of the present invention. After starting at block 605, the method proceeds to block 610 and initializes a counter value (i) to zero. At block 615, the counter value (i) can be compared to the value (N) stored in section 325, which indicates a number of sequential accesses possible (length) for fusion in queue entry 300 to determine whether the counter value (i) is less than N. If (i) is greater than N, the method 600 ends. If the counter value (i) is less than N, the method 600 proceeds to block 620. At block 620, the MC 115 can generate an activate command (ACT) to access a memory location in memory 110 associated with memory address resultant from a summation of the transaction address stored in section 315 with the counter value (i), (Txn_Addr+i). At block 625, the method 600 can perform a command associated transaction type 310 (READ, WRITE, etc.) at the resultant memory address and allocates storage space in a memory map (not shown) to keep track of transaction request messages and any associated data. At block 630, the method 600 can perform a precharge command (PRE) to close access to the open row of the bank of memory 110. At block 635, counter value (i) can be incremented. Accordingly, through method 600, transaction and command requests for a variety of sizes can be generated and processed by the MC 115 in order to manage data traffic to and from memory 110 as needed.

Figure 7:
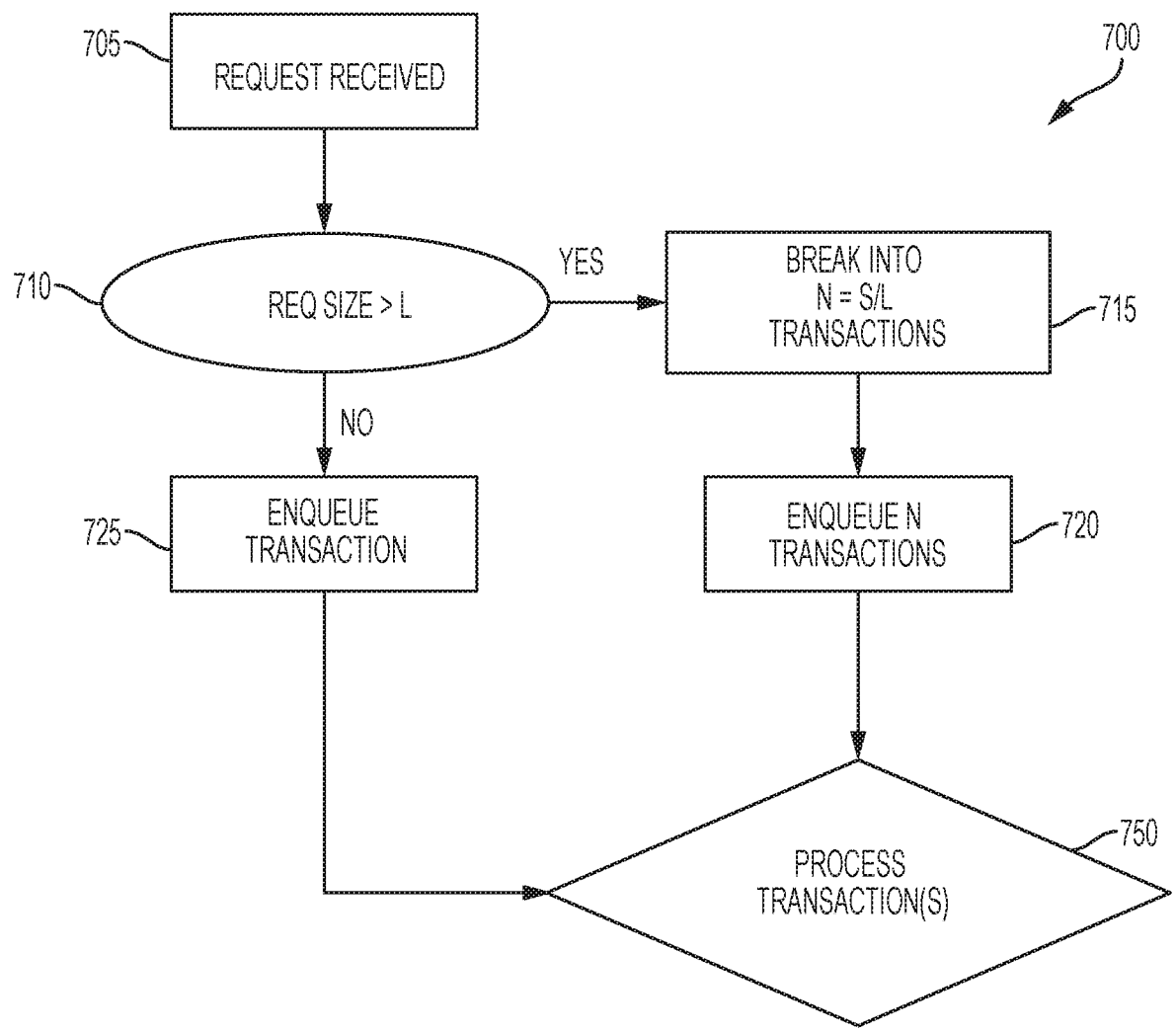
FIG. 7 is a flow diagram illustrating a method disaggregating transaction requests according to one or more embodiments of the present invention.

FIG. 7 is a flow diagram illustrating a method 700 of disaggregating transaction request messages according to one or more embodiments of the present invention. At block 705, a transaction request message can be received. A size associated with the transaction request message can vary. At block 710, the size of the transaction request message can be compared to a predetermined length (L). The predetermined length can be associated with a line size associated with a given model for MC 115. If the transaction request message size is less than the predetermined length, the method 700 proceeds to block 725 in which the transaction request message can be enqueued for processing by the MC 115. If the transaction request message size is greater than the predetermined length (L), the method 700 proceeds to block 715. At block 715, the requested transaction can be broken down to a number of smaller transactions (N). The value N can be determined by dividing a size (S) associated with the transaction request message by a size (L) associated with a maximum size of a transaction request message that can be handled by the MC 115. At block 720, each transaction request message of the N transaction request messages determined in block 715 can be enqueued for processing by the MC 115. Accordingly, the method 700 can enable the MC 115 to be used by a plurality of memory systems and allow the MC 115 to service transaction request messages from processor 105 of varying sizes (L).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for fusing one or more electronic transaction request messages, the method comprising:
   comparing, by a memory controller, at least two transaction request messages, the at least two transaction request messages comprising a first transaction request message and a second transaction request message;
   determining, by the memory controller, that the first transaction request message and the second transaction request message are of a same transaction type;
   determining, by the memory controller, that the first transaction request messages is directed to a first portion of a memory and the second transaction request message is directed to a second portion of the memory responsive to determining the first transaction request message and the second transaction request message are of the same transaction type; and
   fusing, by the memory controller, the second transaction request message in to the first transaction request message responsive to determining that the first portion of the memory is contiguous to the second portion of the memory and based on a determination that the first transaction request message and the second are of the same transaction type; and
   determining, by the memory controller, a third transaction request message that is of the same transaction type as the first transaction request message and the second transaction request message, wherein the third transaction request message is directed to a third portion of the memory;
   determining that the third portion of the memory is contiguous to the first portion of memory and the second portion of memory;
   fusing, by the memory controller, the third transaction request message in to the first transaction message and the second transaction request message responsive to determining the third transaction request message is of the same transaction type and that the third portion of memory is contiguous to the first portion of memory and the second portion of memory.

2. The computer-implemented method of claim 1 wherein the at least two transaction request messages are stored in a queue.

3. The computer-implemented method of claim 2, wherein the memory controller frees locations within the queue associated with the at least two transaction request messages that do not store the single transaction request message.

4. The computer-implemented method of claim 2, wherein the queue uses a transaction request message entry.

5. The computer-implemented method of claim 4, wherein the transaction request message entry comprises a plurality of sections, wherein at least one section indicates a number of sequential accesses to the memory.

6. The computer-implemented method of claim 1, wherein the at least two transaction request messages are generated from two or more sources.

7. The computer-implemented method of claim 1, wherein a length of the fused transaction request message varies.

8. A computer program product for fusing one or more transaction request messages, the computer program product comprising:
   a computer readable storage medium having stored thereon first program instructions executable by a processor to cause the processor to:
   compare at least two transaction request messages, the at least two transaction request messages comprising a first transaction request message and a second transaction request message;
   determine that the first transaction request message and the second transaction request message are of a same transaction type;
   determine that the first transaction request messages is directed to a first portion of a memory and the second transaction request message is directed to a second portion of the memory responsive to determining the first transaction request message and the second transaction request message are of the same transaction type; and
   fuse the second transaction request message in to the first transaction request message responsive to determining that the first portion of the memory is contiguous to the second portion of the memory and based on a determination that the first transaction request message and the second are of the same transaction type; and determine a third transaction request message that is of the same transaction type as the first transaction request message and the second transaction request message, wherein the third transaction request message is directed to a third portion of the memory;

determine that the third portion of the memory is contiguous to the first portion of memory and the second portion of memory;

fuse the third transaction request message in to the first transaction message and the second transaction request message responsive to determining the third transaction request message is of the same transaction type and that the third portion of memory is contiguous to the first portion of memory and the second portion of memory.

9. The computer program product of claim 8, wherein the at least two transaction request messages are stored in a queue.

10. The computer program product of claim 9, wherein the memory controller frees locations within the queue associated with the at least two transaction request messages that do not store the single transaction request message.

11. The computer program product of claim 9, wherein the queue uses a transaction request message entry.

12. The computer program product of claim 11, wherein the transaction request message entry comprises a plurality of sections, wherein at least one section indicates a number of sequential accesses to the memory.

13. The computer program product of claim 8, wherein the at least two transaction request messages are generated from two or more sources.

14. The computer program product of claim 8, wherein a length of the fused transaction request message varies.

15. A system for fusing one or more transaction request messages, the system comprising:

a storage medium, the storage medium being coupled to a processor;

the processor configured to:

compare at least two transaction request messages, the at least two transaction request messages comprising a first transaction request message and a second transaction request message;

determine that the first transaction request message and the second transaction request message are of a same transaction type;

determine that the first transaction request messages is directed to a first portion of a memory and the second transaction request message is directed to a second portion of the memory responsive to determining the first transaction request message and the second transaction request message are of the same transaction type; and fuse the second transaction request message in to the first transaction request message responsive to determining that the first portion of the memory is contiguous to the second portion of the memory and based on a determination that the first transaction request message and the second are of the same transaction type; and determine a third transaction request message that is of the same transaction type as the first transaction request message and the second transaction request message, wherein the third transaction request message is directed to a third portion of the memory;

determine that the third portion of the memory is contiguous to the first portion of memory and the second portion of memory;

fuse the third transaction request message in to the first transaction message and the second transaction request message responsive to determining the third transaction request message is of the same transaction type and that the third portion of memory is contiguous to the first portion of memory and the second portion of memory.

16. The system of claim 15, wherein the at least two transaction request messages are stored in a queue.

17. The system of claim 16, wherein the memory controller frees locations within the queue associated with the at least two transaction request messages that do not store the single transaction request message.

18. The system of claim 16, wherein the queue uses a transaction request message entry comprising a plurality of sections, wherein at least one section indicates a number of sequential accesses to the memory.

* * * * *